(12) United States Patent
Grassi (10) Patent No.: US 8,581,431 B2
(45) Date of Patent: Nov. 12, 2013

(54) COMPLETELY SUBMERGED WAVE ENERGY CONVERTER

(75) Inventor: Michele Grassi, Forte Dei Marmi (IT)

(73) Assignee: 40South Energy Limited, London (GB)

( * ) Notice: Subject to any disclaimer, the term of this patent is extended or adjusted under 35 U.S.C. 154(b) by 691 days.

(21) Appl. No.: 12/312,901

(22) PCT Filed: Nov. 28, 2006

(86) PCT No.: PCT/IT2006/000825
§ 371 (c)(1),
(2), (4) Date: Mar. 8, 2010

(87) PCT Pub. No.: WO2008/065684
PCT Pub. Date: Jun. 5, 2008

(65) Prior Publication Data
US 2010/0164227 A1    Jul. 1, 2010

(51) Int. Cl.
*F03B 13/10* (2006.01)

(52) U.S. Cl.
USPC .............................................. 290/53; 290/42

(58) Field of Classification Search
USPC .................... 290/53, 42, 52; 417/332–333; 60/495–496
See application file for complete search history.

(56) References Cited

U.S. PATENT DOCUMENTS

| | | | |
|---|---|---|---|
| 3,848,419 A | 11/1974 | Bowley | ................................ 61/5 |
| 4,177,643 A | 12/1979 | Lorphelin | |
| 4,232,230 A * | 11/1980 | Ames | ................................ 290/53 |
| 4,363,213 A | 12/1982 | Paleologos | |
| 4,453,894 A * | 6/1984 | Ferone et al. | ................................ 417/332 |
| 4,531,063 A | 7/1985 | Vielmo et al. | |
| 4,672,222 A * | 6/1987 | Ames | ................................ 290/53 |
| 4,754,157 A * | 6/1988 | Windle | ................................ 290/53 |

(Continued)

FOREIGN PATENT DOCUMENTS

| | | |
|---|---|---|
| EP | 1589643 | 10/2005 |
| GB | 2119449 | 11/1983 |

(Continued)

OTHER PUBLICATIONS

Welcome to WPP A/S-Wave Energy about WavePlane 2004, inlcuding article "WaveFlexGrid" Jan. 2003 [retrieved Apr. 8, 2013, http://www.waveplane.com.*

(Continued)

*Primary Examiner* — Michael Zarroli
(74) *Attorney, Agent, or Firm* — Meunier Carlin & Curfman, LLC (57) ABSTRACT

A wave energy converter apparatus comprising at least two members joined by a connector movable so as to allow displacement of the members relative to one another in response to waves in water where the apparatus is located. The apparatus also includes an energy converter for converting motion of the connector to electrical energy, and a device for storing and/or transporting elsewhere the energy produced. The members, when in use and located in a body of water, are non-floating and completely submerged, the apparatus, as a whole, being neutrally buoyant. A member is additionally provided for maintaining each of the submerged members substantially at rest relative to the surrounding water with which they are in contact, such that the submerged members move under wave-induced action substantially in the same manner as a water particle would move under wave-induced action if located in the same region as the respective submerged member.

23 Claims, 5 Drawing Sheets

(56) References Cited

U.S. PATENT DOCUMENTS

| | | | |
|---|---|---|---|
| 5,136,173 A * | 8/1992 | Rynne | 290/53 |
| 5,411,377 A * | 5/1995 | Houser et al. | 417/333 |
| 6,392,314 B1 * | 5/2002 | Dick | 290/53 |
| 6,768,216 B1 * | 7/2004 | Carroll et al. | 290/42 |
| 6,768,217 B2 * | 7/2004 | Chalmers et al. | 290/53 |
| 6,791,205 B2 * | 9/2004 | Woodbridge | 290/53 |
| 6,857,266 B2 * | 2/2005 | Dick | 60/496 |
| 7,385,301 B2 * | 6/2008 | Hirsch | 290/42 |
| 7,969,031 B2 * | 6/2011 | Steelberg et al. | 290/42 |
| 8,013,462 B2 * | 9/2011 | Protter et al. | 290/53 |

FOREIGN PATENT DOCUMENTS

| | | |
|---|---|---|
| JP | 58-096178 | 6/1983 |
| JP | 09-506951 | 6/1995 |
| SU | 1208299 | 1/1986 |
| WO | WO 95/17555 | 6/1995 |
| WO | WO 9928623 | 6/1999 |
| WO | WO 03026954 | 4/2003 |
| WO | WO 2004065785 A1 * | 8/2004 |
| WO | WO 2005045136 | 5/2005 |

OTHER PUBLICATIONS

Wave Dragon 2005, including article Simple and Robust Construction—complex design [retrieved Apr. 8, 2013], http://www.wavedragon.net.*
Harvesting the Motion of the Ocean, AquaEnergy Group, Jan. 31, 2006.*
Pelamis Wave Power history, [retrieved Apr. 24, 2013], http://www.pelamiswave.com/history.*
World-wide Wave Market Research, 2007, [retrieved Apr. 24, 2013], INRIWaveEnergyResearch2007, www.inri.us-WaveStudy.*
AWS Ocean Energy, About Us, 2004, [retrieved Apr. 24, 2013], http://www.awsocean.com/aboutus.aspx.*

* cited by examiner

COMPLETELY SUBMERGED WAVE ENERGY CONVERTER

FIELD OF THE INVENTION

This disclosure relates generally to energy and, more particularly, to arrangements for power generation and the like.

BACKGROUND OF THE INVENTION

Conventional wave energy converters have experienced considerable problems including low efficiency, complex design, and/or high cost of maintenance resulting in considerable limitations in their use.

Firstly, known WECs use mainly the vertical component of the wave motion. Since the wave motion is generally circular, a significant component of the motion is wasted, see for example the devices in U.S. Pat. No. 4,453,894, U.S. Pat. No. 6,857,266, WO2004065785, U.S. Pat. No. 4,232,230, U.S. Pat. No. 4,672,222, U.S. Pat. No. 5,411,377, and the devices Pelamis, AWS WEC and AquaBuOY marketed respectively by the companies OPD Ltd (www.oceanpd.com), AWS Ocean Energy Ltd (www.waveswing.com) and AquaEnergy Group Ltd (www.aquaenergygroup.com).

In some cases, e.g. the devices shown in U.S. Pat. No. 4,453,894 and U.S. Pat. No. 6,857,266, the installation has a natural frequency of oscillation, and therefore is capable of using efficiently only waves with certain frequencies, or a latching mechanism is needed to overcome this limitation.

On the other hand, in order to seek the highest possible efficiency, known WECs using floating or near surface elements need to be oriented depending on the direction of the wave system which is to be harvested for energy. In any case, the efficiency is satisfactory only when harvesting monochromatic waves, or in any case waves moving all in the same general direction, as in the device of US2005167988A1, and in the device Pelamis and WavePlane (by the company WavePlane Production A/S, www.waveplane.com).

Furthermore, many known devices must be linked to the ground or placed in the surf zone, like for example in US2005167988A1, U.S. Pat. No. 5,411,377, and in the above mentioned devices AWS WEC, Pelamis and AquaBuOY. Therefore, they cannot be positioned where the waves are biggest and with the highest energy potential. Moreover, the on-shore or near-shore ones are bulky and hardly compatible with environmental protection.

Finally, as mentioned, the majority of the known devices use a surface float to extract energy from the wave motion or in any case they have a substantial part of their volume above the surface of the water at least during some part of the wave cycle, which can expose them excessively to severe weather and to drag due to wind and small waves. This is the case of the installations shown in U.S. Pat. No. 4,453,894, U.S. Pat. No. 6,857,266, WO2004065785, U.S. Pat. No. 4,232,230, U.S. Pat. No. 4,672,222, U.S. Pat. No. 5,411,377, and the Pelamis, AquaBuOY, WavePlane and Wave Dragon (by the company Wave Dragon ApS, www.wavedragon.net). Due to the presence of surface elements which have necessarily a limited size, there is also a structural limitation to the amount of energy which a single device can harvest.

OBJECTS AND SUMMARY OF THE INVENTION

Summary of the Invention

Accordingly, it is an object of the disclosure to provide an apparatus for wave energy conversion that achieves higher efficiency by using all the components of the wave motion.

Another object of the disclosure is to provide a wave energy converter having working efficiency both with a monochromatic wave system and a non monochromatic wave system, without being affected significantly by wave direction and waves of relatively smaller wavelength.

A further object of the disclosure is to provide a wave energy converter having a simple design that is easy to implement and maintain.

Yet an other object of the disclosure is to provide an apparatus for wave energy conversion that yields negligible motion due to natural oscillations.

Still another object of the disclosure is to provide a wave energy converter that may be positioned offshore, in very deep water.

Another object of the disclosure is to provide an apparatus for wave energy conversion that provides satisfactory resistance to severe weather.

This object is achieved with the improved wave energy converter according to the present invention, the essential characteristics of which are defined in the first of the accompanying claims.

BRIEF DESCRIPTION OF THE DRAWINGS

A specific, illustrative wave energy converter, according to the disclosure, is described below with reference to the accompanying drawings, in which.

The same numerals are used throughout the drawing figures to designate similar elements. Still other objects and advantages of the disclosure will become apparent from the following description of the preferred embodiments.

DETAILED DESCRIPTION OF THE PREFERRED EMBODIMENTS

Referring now to the drawings and, more particularly, to FIGS. 1-4, there is shown generally a specific, illustrative wave energy converter, according to various aspects of the disclosure. In one embodiment, shown in FIG. 1, the wave energy converter comprises: an upper submerged member 1 (e.g., a cylindrical tank containing mostly water and air, with an inertial mass as low as possible); a lower submerged member 2, e.g., having six smaller cylindrical tanks 3 of mostly water and air, linked together relatively rigidly in a circular configuration about a generally cylindrical, central linking piece 5; a pole 4 extending between upper member 1 and lower member 2 along a common axis thereof, projecting beyond the lower member and provided internally with an appropriate counterweight system (not shown), at a selected point along its length corresponding to the average position of lower submerged member 2; and a plurality of turbines 6 mounted to respective ends of a transversal rod 7, integrally and orthogonally crossing pole 4 correspondingly with the lower, free end thereof.

Figure 1:
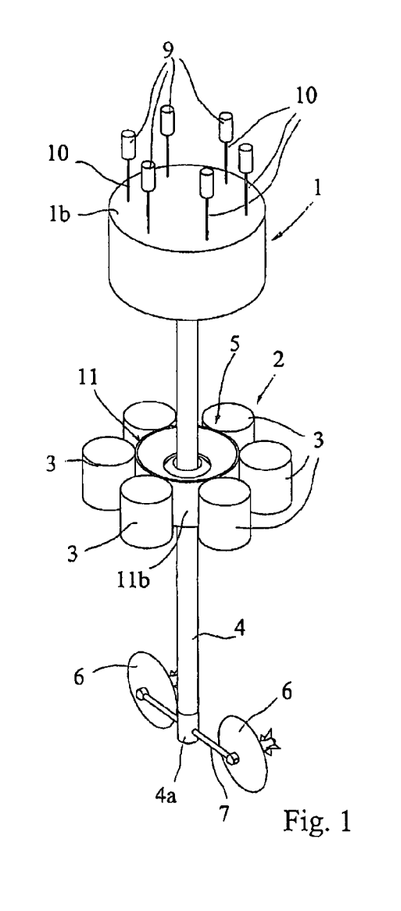
FIG. 1 is a perspective view of a wave energy converter, according to one aspect of the disclosure.
Figure 2:
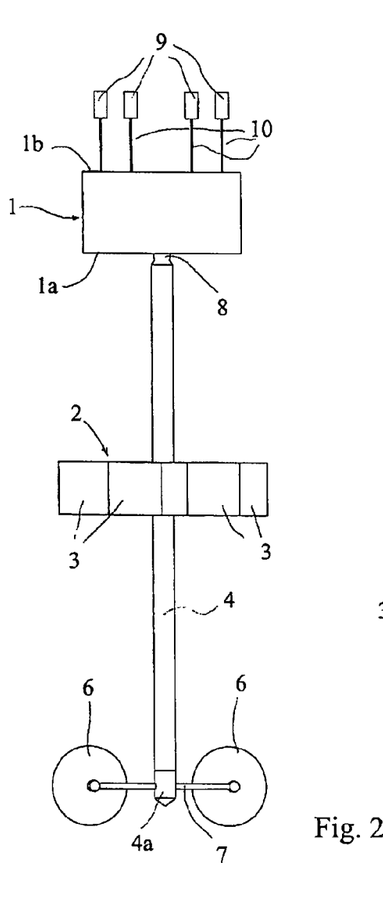
FIG. 2 is a side view of the energy converter shown in FIG. 1.
Figure 3:
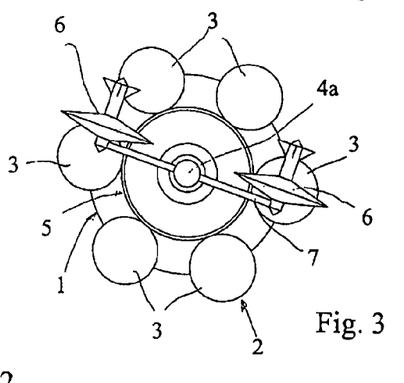
FIG. 3 is a bottom view of the energy converter set forth in FIG. 1.

The pole can also take the shape of a latticed steel structure, with a bigger section than that appearing in the drawings, or in any case a structure assuring enough rigidity and resistance to the stresses at play. The linking piece 5 will be scaled up and modified accordingly. To assist in keeping the position of the submerged members 1 and 2 fixed with respect to the water intimately surrounding them, one can also provide them with virtual mass means, in the shape of partially enclosed water and/or fins.

Pole 4 is desirably mounted to a lower, flat surface 1a of upper submerged tank 1 via a joint 8, such that the orientation of the pole may change relative to the tank. In one embodiment, joint 8 can, for example, be of a ball-and-socket type. A plurality of buoyancy elements 9, e.g., small cylindrical tanks filled with air, are attached to a top flat face 1b of upper submerged member 1 via cables 10. Under the wave action buoyancy elements 9 assist in maintaining upper tank 1 at a relatively constant distance from the water surface and with its top face 1b parallel thereto. The buoyancy elements are alternatively submerged or exposed by waves of shorter wavelength, such that a stabilizing action will result from their average buoyancy force.

Figure 4:
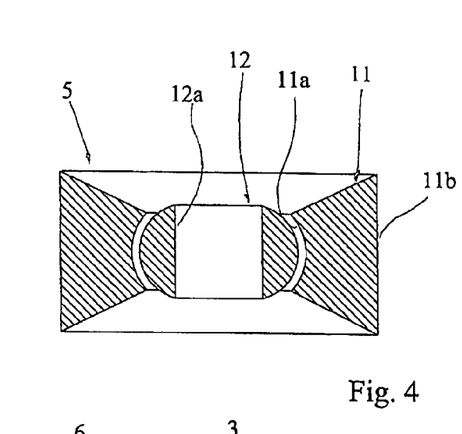
FIG. 4 is a sectional view, taken axially, of a central portion of a lower member of the energy converter illustrated in FIG. 1.

The connection between the same pole and the lower submerged member 2 is realized, as mentioned, via the linking piece 5. In further detail, the linking piece comprises a disc-shaped body 11 on an outer side surface lib of which the smaller tanks 9 are mounted. A spherical housing 11a is formed inside the body 11 for rotatably accommodating a ball member 12 with a through hole 12a for the slidable insertion of the pole 4.

Therefore, there is assured the relative movement of the lower submerged member 2 along the axial direction of the pole 4, thanks to the sliding engagement of the latter with the hole 12a of the ball member 12 of the linking piece 5. Furthermore, the lower member 2 can tilt around the pole via the rotatable engagement of the ball member within the housing 11a of the body 11. Both the sliding and the rotation can be assisted by the provision of balls and/or rollers as in roller or ball bearing configurations or other means to assist the relative movement between the parts so that the lower member can displace and tilt freely with respect to the pole.

For the sake of simplicity, in the drawings the lower member 2 is positioned generally in the middle of pole 4. In practice, however, the portion of the pole 4 between the members 1 and 2 will be on average longer than the portion below and beyond the element 2, in order to impress a greater motion on the turbines 6 in response to the movement of the upper member 1.

The transversal rod 7 is linked to a revolving end segment 4a of the pole 4, so that the rod can rotate around the axis of the same pole 4, while keeping its center on the same axis. The turbines 6 are connected to the ends of the rod 7 with their front side facing the rod, and with a mounting that allows them to rotate around the central axis of the same rod.

An engine system to accumulate and/or transform the energy produced by the motion of the turbines 6, as explained hereafter, is neither shown nor described, having characteristics that, as such, can be learned or derived from the prior art. The engine system can be located inside the lower submerged member 2 and can be for example a device for electrolysis of water and generation of hydrogen, which can then be easily stored and retrieved periodically by ships. If appropriate, one can also use a cable to transfer the generated electricity to a floating or submerged engine room, or directly to the electricity grid.

In use, the apparatus as a whole has neutral buoyancy under normal operation and under rest. During normal operation, the lower member 2 will move much less than the upper member 1 which is under the direct influence of the wave action, as the wave influence decreases rapidly with depth. In particular, in a limit situation in which the biggest wavelength of incident waves is lower than, or equal to, the distance between the members 1 and 2, the lower member 2 will remain approximately unmoved under a wave cycle. In a real deployment, in which for practical reasons the above mentioned average distance between members 1 and 2 will in general be shorter than a full wavelength, the motion of the lower member can be further reduced by increasing its inertial mass (and correspondingly its buoyancy, to leave it with total neutral buoyancy).

On the other hand, the upper member 1 would tend to move in a circular path under the influence of a monochromatic wave with wavelength comparable to the above mentioned distance (as it is usual for the motion of water particles under the influence of a monochromatic wave). If the wave system is not monochromatic, the movement of the upper member 1 will be a superposition of the various circular paths determined by the various monochromatic waves which are the dominant components of the wave system.

The buoyancy of the upper member 1 and the buoyancy elements 9 is precisely balanced by the counterweight inside the pole 4, and by the weight of the same pole along with the transversal rod 7 and the turbines 6, to keep the water level at about half the height of the buoyancy elements 9 on average. Due to the presence of the lower submerged member 2 and the inertia of the counterweight inside the pole 4, the circular motion of the upper member 1 is transformed in a closed trajectory of the lower end of the pole 4. This trajectory is only very roughly circular, as the motion would be circular only if the lower member 2 were always exactly at the midpoint of the pole 4, which cannot happen under normal operation.

Under the wave action, the lower end of the pole 4 then moves with respect to the surrounding water and therefore the whole assembly of transversal rod 7 and turbines 6 moves setting the turbines into motion. Using fins and/or motors the turbines 6 can be kept always pointed in the direction of motion with respect to the surrounding water, so as to obtain a better efficiency. During the whole wave cycle of a monochromatic wave system the turbines make a turn of 360° around the axis of the transversal rod 7. With a monochromatic wave system the rod 7 does not rotate with respect to the pole 4. If the wave system is a superposition of different monochromatic wave systems, the turbines 6 will always be kept pointed in the direction of motion with little effort due to the fact that they describe a closed trajectory with respect to the surrounding water and hence the redirection can be incremental.

Depending on the efficiency of the turbines 6 in extracting energy from their motion through the water and to the position of the linking piece 5 along the pole 4 during a wave cycle, the trajectory of the lower end of the pole will tend to become roughly elliptical instead of circular. To a smaller extent also the trajectory of the upper member 1 will tend to become roughly elliptical. By varying the position of the lower member 2 with respect to the two ends of the pole 4, one can modify the shape and size of this trajectory. In particular it may be useful to adapt at least slightly this position dynamically, depending on the wave regime, by raising or lowering the lower member 2 via variable buoyancy devices and/or propellers, to optimize the speed and therefore the efficiency of the turbines 6.

Under a complete wave cycle, the resultant of the forces exerted on the lower submerged member 2 will be approximately vertical and will depend only on the energy and shape of the waves affecting the apparatus. Therefore, in order to keep the lower member 2 at a constant average position, it will be sufficient to have a control system which considers its average position after many wave cycles, and the interventions will be incremental and small compared to the energy of the waves acting on the apparatus. In particular, if the shape and energy of the waves remain constant for a while, the apparatus will reach equilibrium and no further interventions will be needed to stabilize the lower member 2. The control system may be a static device of the kind of the buoyancy elements 9 (see the second embodiment described further on) or even simply consisting of variable buoyancy devices driven by a computerized control device.

The length of the pole 4 for an oceanic apparatus could be in excess of 50 meters to have the lower member 2 in a region much less affected by the dominant waves than the upper member 1, but could be shorter to reduce costs. In fact, even with a shorter pole the apparatus works in a satisfactory manner, as the wave action decreases rapidly with depth, and moreover the horizontal component of the motion of the lower end of the pole 4 would be in a roughly opposite direction to that of the surrounding water. The dimensions will in any case be optimized to obtain a highly efficient device, also taking into account the dominant wave regimes of the area of deployment.

The upper member 1 will remain above the lower member 2 even after many wave cycles, due to the nature of the wave motion which, in a good approximation, does not involve an overall displacement of the water. In order to compensate for the possible action of the wind, friction, of water currents with different speed and/or direction at the different depths of the members 1 and 2, and also for possible unforeseen extraordinary events, the buoyancy of the upper member 1 and the weight of the pole 4 and the turbines 6 will be optimized to provide a sufficiently strong righting moment. As an alternative, or to be able to compensate more rapidly the effect of exceptional events, small propellers can be placed on the members 1 and 2 and/or along the pole 4, controlled by a computerized control system.

The buoyancy elements 9 can be replaced by variable buoyancy devices attached to the upper member 1 and driven by a computerized control system. The upper member 1 will in any case tend to remain at a constant average distance from the surface of the water, and on average with its upper face parallel to it, and therefore the interventions of this control system will be of a small scale compared to the energy of the wave action on the apparatus. In this way one can achieve total submersion, possibly many meters below the sea surface, which can be useful to minimize wear and tear and the possibility of hazard to ships.

In a typical oceanic configuration, the upper tank 1 will have a volume in the range of 1000 m$^3$, while the smaller lower tanks 3 will have a volume in the range of 200 m$^3$. The volume of the lower submerged member 2, which can easily exceed 1000 m$^3$ in an oceanic deployment, leaves ample room for the various configurations of the energy conversion system which one might want to utilize.

In a simplified version, the junction between the pole 4 and the upper member 1 can be rigid, keeping the pole always perpendicular to the lower surface 1a of the tank 1, which in this case can more efficiently take spherical shape with only one buoyancy element 9 attached with a cable to its upper pole. The linking piece 5 can take the shape of a simple ball-and-socket type of joint, especially in smaller scale deployments, or make use of a cardan joint.

In another simplified version, the function of the lower submerged member 2 may be taken by the sole linking piece 5, placed at a fixed position along the pole 4 and containing the counterweight. This simplification, together with the previously mentioned one regarding the junction between the pole and the upper member, although causing a certain decay in the efficiency of the apparatus, allows for the quick construction of very simple and cheap implementations, which is useful among other things for testing and prototyping purposes. If the apparatus is connected directly to the electricity grid or to an external engine room via a cable system, there is also no need for an engine room embodied in the apparatus, thus reducing further its complexity.

Figure 5:
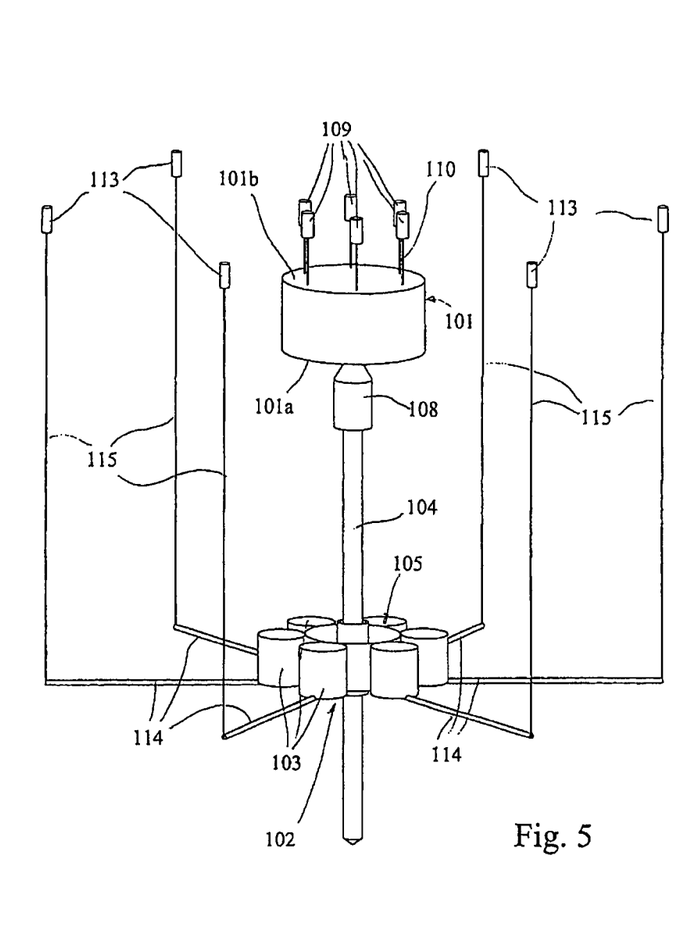
FIG. 5 is a perspective view of a wave energy converter, according to another aspect of the disclosure.
Figure 6:
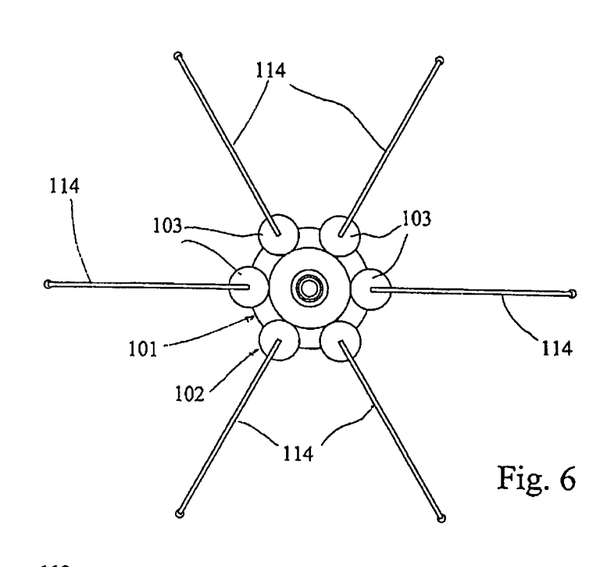
FIG. 6 is a bottom view of the energy converter shown in FIG. 5.
Figure 7:
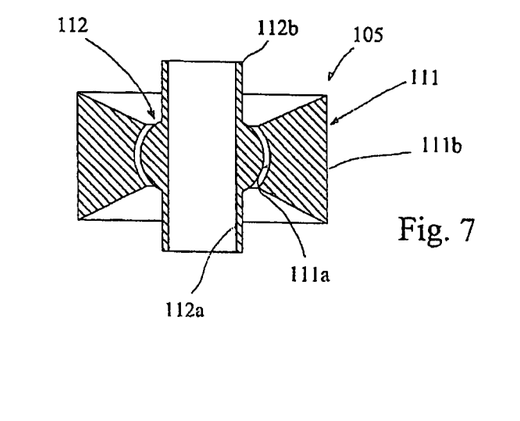
FIG. 7 is a sectional view, taken axially, of a central portion of a lower member of the energy converter set forth in FIG. 5.

Referring now to FIGS. 5 to 7, in a second embodiment of the apparatus according to the invention, parts corresponding to those of the first embodiment are indicated with corresponding reference numerals and will not be described again. Also the general behavior of this apparatus under the wave action is the same as that of the first embodiment, with a lower submerged member 102 remaining mainly at rest and an upper submerged member 101 following the water motion due to the wave passage and keeping its orientation so that its upper face 101b is always substantially parallel to the water surface. Also in this case, the use of virtual mass means (enclosed water and/or fins) can be contemplated.

However, in this embodiment the lower end of the pole 104 is free, that is to say lacking of the assembly of transversal rod and turbines. The extraction of energy from the motion of the apparatus is carried out via hydraulic and/or electric devices housed within a joint 108 connecting the lower face 101b of the upper tank 101 with the pole 104, and also within the linking piece 105 between the pole 104 and the lower member 102. The joint 108, in the same manner as the previous embodiment, allows for the change of orientation between the pole and the upper tank, and this relative movement, driven by the wave motion, is exploited by the above cited devices to extract energy. The devices embodied in the linking piece 105 extract energy from the reciprocating motion of the pole 104 through the hole 112a. This type of devices are already known as such, and will not described in detail. For instance, inside the element 105 one can have a linear electric generator (see e.g. the linear generator device inside the WEC buoy proposed by the MRSF of the School of Electrical Engineering and Computer Science, Oregon State University http://eecs.oregonstate.edu/msrf/), while inside the element 108 one can have one or more pulleys or rollers driven by the relative movement and linked to dynamos.

In this embodiment one can also notice a plurality of further buoyancy elements 113 attached to the lower submerged member 102 via radial beams 114 projecting from the smaller tanks 103, and cables 115 connected to the free ends of the beams 114. The elements 113 contribute to the preservation of the orientation and position of the apparatus with respect to the average water surface. Also, the average resultant of the forces exerted on the lower member 102 will change from the rest position to normal operation, and the elements 113 will compensate for this. The hole 112a in the ball member 112 is in this case a bore of a sleeve 112b projecting axially from opposite sides of the ball member.

In a simplified version of this embodiment, the pole 104 may be replaced by a cable with the counterweight attached to its lower end. In this case, it may be practical to place the lower member 102 at a much greater distance from the upper member 1 than in the configuration with a pole. Then, the lower member 102 may end up in the proximity of the sea bottom, and if appropriate may even be moored to it to simplify its design. This very last version of the apparatus would be however more difficult to deploy and maintain, and more exposed to severe weather.

A further alternative is to connect the upper and lower submerged members via an extensible pole, of the type described further on for a third embodiment, provided with energy extraction systems that exploit the reciprocating extension and contraction movement of the pole. In this way, one can get rid of the energy extraction devices in the linking piece 105 itself, and the pole 104 can end in the linking piece instead of passing through and beyond it. This makes the apparatus more compact, though with the drawback of a more complex structure of the pole. Under exceptionally big waves the whole apparatus will move, as in this case also the lower member will be interested by the wave action. This reduces the possibility of a motion capable of disassembling the apparatus.

In any case, a possible separation of the two parts will not be destructive, and the apparatus can afterwards be reassembled by letting the pole go back through its housing in the linking piece (or connecting back to each other the two parts of the pole if a design as in the third embodiment is adopted). This operation can be also made automatic, with a computerized control system on both parts and small propellers, plus the possibility of changing the distance of the lower member from the water surface (for example by lengthening the cables keeping the elements 113 into place).

Figure 8:
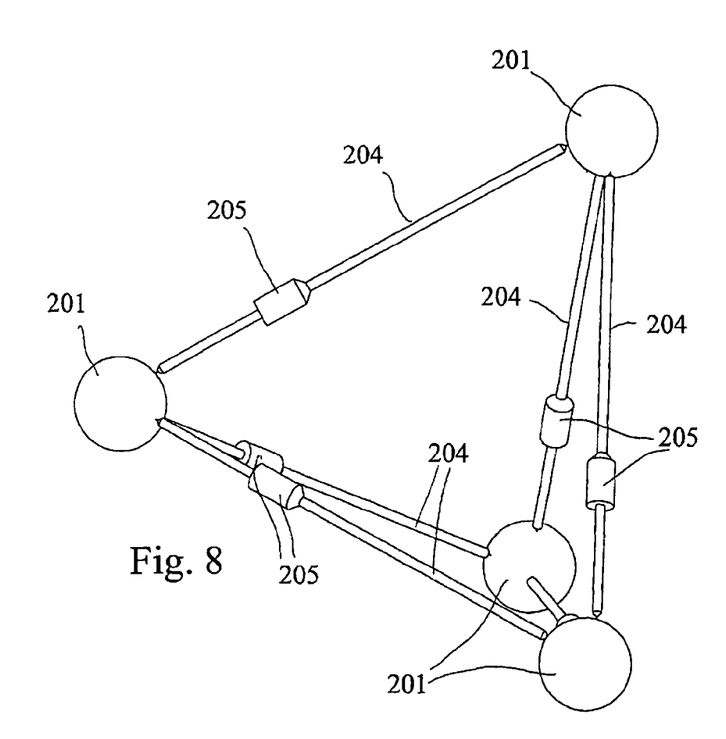
FIG. 8 is a perspective view of a wave energy converter, according to a further aspect of the disclosure.
Figure 9:
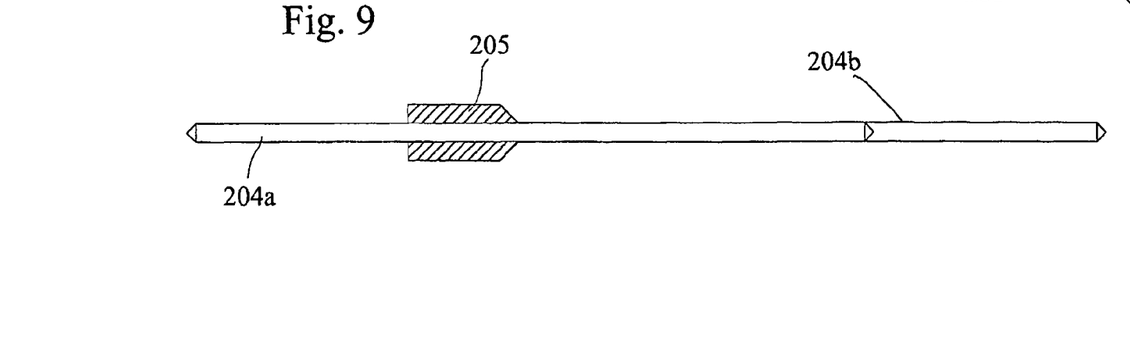
FIG. 9 is a sectional view, taken axially, of a pole of the energy converter shown in FIG. 8.

With reference to FIGS. 8 and 9, in a third embodiment of the apparatus according to the invention, the full wave motion is captured using only linear electric generators. In this embodiment the apparatus comprises a plurality of submerged members 201, e.g. four members having the shape of spherical tanks containing mainly water and air, mutually joined by connecting poles 204 so as to define a 3D structure, generally tetrahedral in the example.

Each pole 204 (FIG. 9) consists of a stick 204a coaxially and telescopically engaging in a slidable manner within a tubular sleeve 204b. The ends of the assembly so obtained are connected to respective submerged members 201. A linear electric power generator 205, fed by the mutual reciprocating movement of the stick 204a and sleeve 204b, is connected to the inner end of the same sleeve. Also this kind of power generation device is known as such, represented schematically and not described in detail. Reference can however be made to what already mentioned for the second embodiment.

Both a single member 201 and a single pole 204 (with the relevant generator 205) are neutrally buoyant when immersed in water at their average operating depth. Under the influence of the waves the different tanks 201 will find themselves in different water motion regimes, either because spaced by a distance not multiple of the wavelength or because at different depths. The relative movement between them will create tension or pressure on the connecting poles 204. As a consequence, the inner stick 204a will move with respect to the outer sleeve 204b, and this linear reciprocating motion is exploited to generate electricity. Power is therefore extracted from the relative motion of different parts of the connecting means among themselves. The geometry of the structure, also in this case, is such that all (circular) movement of water particles due to the wave action is harvested for energy.

On average, all the members 201 will tend to remain in the same position, remaining substantially at rest with respect to the surrounding water whose average position does not move even after many cycles of the wave motion. Virtual mass means can be used also in this case. However, to keep the submerged members 201, on average, in their nominal tetrahedral configuration, it will be necessary from time to time to give back some of the energy, to move the average position of the tanks and poles so as to counteract any displacement due to drift, different buoyancy at different depths, currents or unbalanced operation of the various parts. This can be carried out by using the linear generators as linear electric motors and/or by attaching small propellers to the structure and/or by putting springs inside the poles and/or using variable buoyancy devices.

If one of the tanks 201 is heavier than the other three identical ones (though displacing the same amount of water), the system, designed to have in any case neutral total buoyancy, will tend to orient itself with three upper submerged tanks and one lower one. In this case these lighter members with the poles that connect them to each other could be replaced by a single submerged member as the upper member 1, 101 of the previous embodiments, so that the whole apparatus can be kept at a substantially fixed depth below the water surface. The other connecting poles to the lower tank could as well be replaced with a single pole, so as to generate the variant envisaged above when referring to the second embodiment. Analogous degenerations of the structure of this third embodiment may be envisaged if one tank is lighter than the other three identical ones. As in the previous embodiments, the apparatus may be kept on average at a fixed depth below the surface by the use of variable buoyancy devices attached to the tanks and controlled by a computerized control system.

The engine room can be positioned inside one or more of the tanks 201 which in a typical oceanic deployment may have a volume of 1000 m$^3$ (the actual volume will depend from the optimization chosen, which in turn will depend, among other factors, from the typical wave regime of the region of deployment).

As in the previous embodiment, under extremely big waves the apparatus will tend to move as a whole, and therefore there will not be excessive relative movements between its parts. By positioning variable buoyancy devices on the tanks and/or on the poles, linked to a computerized control system, one can also arrange for the whole apparatus to sink deeper in response to bigger waves, and to rise when the waves are smaller, thus protecting it from severe weather and optimizing its efficiency.

The tetrahedral structure shown in the example is the simplest 3D rigid structure that may be adopted; but many other 3D configurations are possible with the same simple basic design. For example, a plurality of tetrahedral modules as the one described above can be interconnected to form a whole structural layer, extending for many square kilometers. Such a structure can be kept at a fixed depth of a few tens of meters below the average sea surface, to avoid interference with ships and minimize hazard due to storms and very big waves. Such a structure would be modular with respect to power generation and maintenance, considering that the failure of single modules will not prevent a satisfactory work of the whole system.

Figures 10, 11, 13:
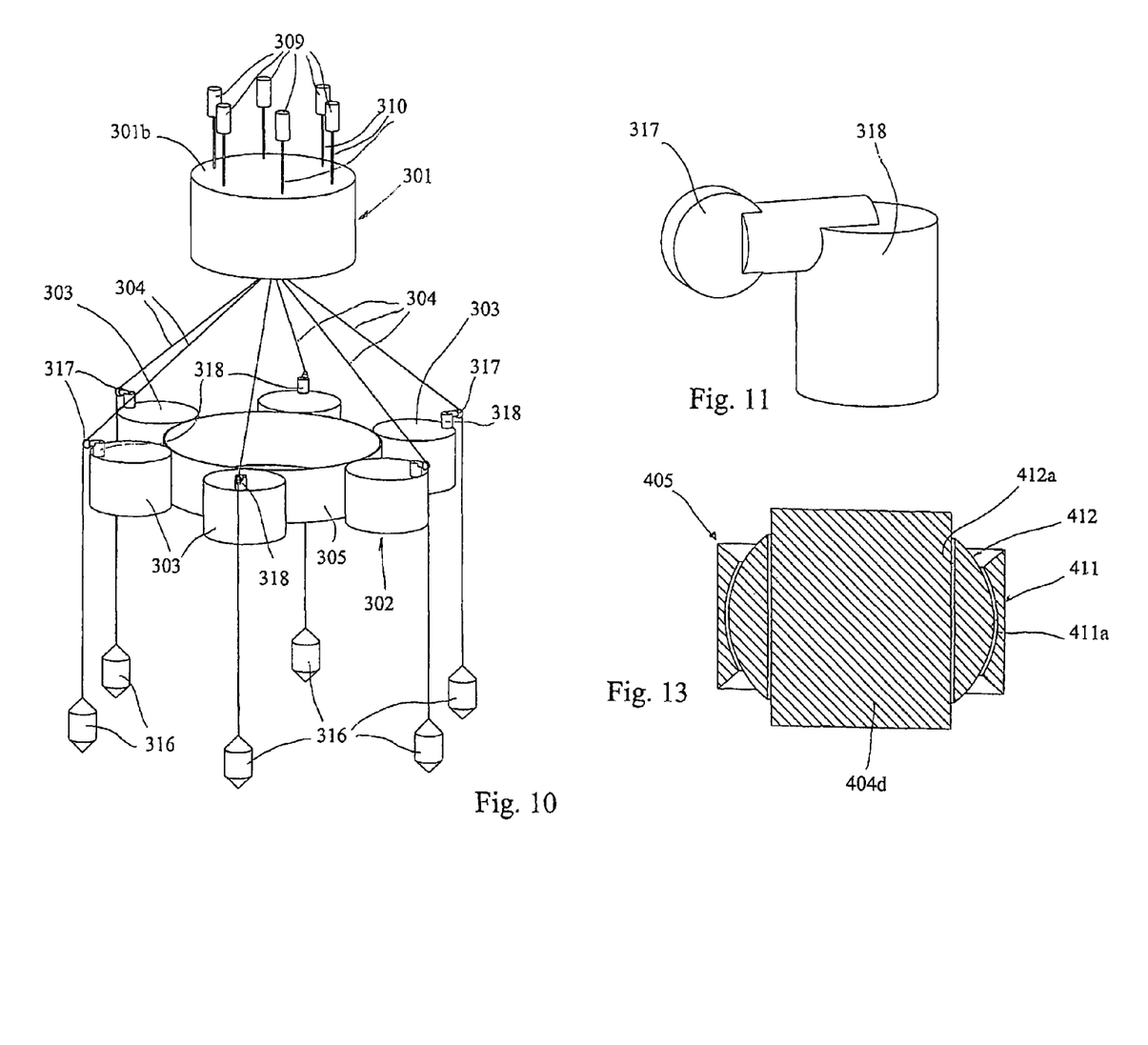
FIG. 10 is a perspective view of a wave energy converter, according to still another aspect of the disclosure.
FIG. 11 is a perspective view of a peripheral part of a lower member of the energy converter illustrated in FIG. 10.
FIG. 13 is a sectional view, taken axially, of a central portion of a lower member of the wave energy converter illustrated in FIG. 12.

With reference to FIGS. 10 and 11, in a fourth embodiment of the apparatus according to the invention, the full wave motion is captured using only dynamos coupled to cables via pulleys. Also in this embodiment, however, power is extracted from the relative motion between an upper submerged member and a lower submerged member, and from the consequent displacement of a system connecting the members. In fact, this embodiment shares many features with the first and second embodiments described above, and corresponding parts are denoted at corresponding reference numerals. In this embodiment a lower submerged member 302 consists of a plurality of tanks 303, rigidly connected to each other in sequence via a central ring 305 and around it.

Instead of a pole connecting the upper submerged member 301 (with buoyancy elements 309) with the lower submerged member 302, cables 304 are attached with a first end to the upper member 301 and with the other end to weights 316, passing through deviation pulleys 317 supported by frames 318 mounted on the outside of respective submerged tanks 303. The pulleys 317 drive respective dynamos for the generation of electricity, not shown, located inside the support frames 318 or in the tanks 303. Under the action of a monochromatic wave (considered here for simplicity), the upper member 301 tends to describe a generally circular trajectory. This determines alternatively traction or release on the cables, which will make the pulleys 317 move and therefore generate electricity.

The presence of the weights 316 guarantees power generation during both traction and release, and also that on average the upper member 301 will be positioned above the center of mass of the lower member 302. The lower tanks 303 tend to remain on average at their position, due to the water that they displace, to their inertial mass and to their virtual mass due to partially enclosed water and/or fins. To compensate for exceptional events and for small drift due to unbalanced frictions or currents, small propellers and/or variable buoyancy devices should be associated to tanks 303 or ring 305, controlled by a computerized control system. In a variant of this embodiment the lower submerged tanks 303 can be kept in position also by additional buoyancy elements as in the second embodiment.

Referring now to FIGS. from 12 to 16, a fifth embodiment of the apparatus according to the invention is similar to the first embodiment, as made clear also by the use of corresponding numerals for identical or analogous parts. An upper submerged member 401, with buoyancy elements 409, and a lower submerged member 402 have the same general structure as in the first embodiment. The same applies to a linking piece 405 with an outer disc-shaped body 411 and rotatable ball member 412 with a hole 412a (FIG. 13). As in the previous embodiments, use can be made also of virtual mass means (partially enclosed water and/or fins).

Figures 12, 14, 15, 16:
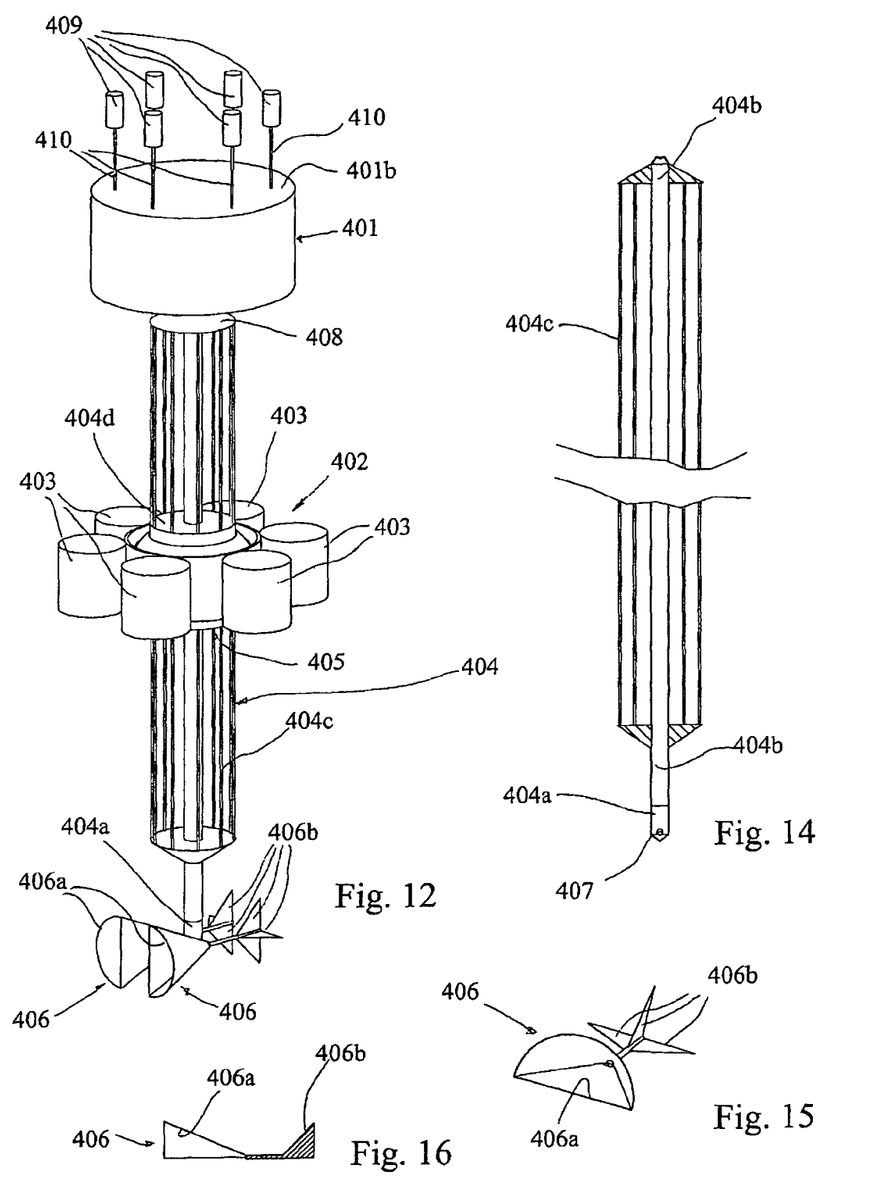
FIG. 12 is a perspective view of a fifth embodiment of the WEC according to the disclosure.
FIG. 14 is a sectional view, taken axially, of a cage structure of the wave energy converter shown in FIG. 12.
FIGS. 15 and 16 are perspective and axial sectional views, respectively, of a water collector of the wave energy converter set forth in FIG. 12.

The hole 412a, much wider than in the previous embodiments, accommodates a central cylindrical block 404d of a pole 404, represented schematically, enclosing a counterweight and an engine room for the production of electric energy, as explained hereafter. The pole 404 further comprises a central core 404b extending axially from both flat basis of the block 404d. Around the core 404b a reinforcing cage 404c projects axially from the periphery of the block 404d.

The upper end of the pole 404 is connected to the upper submerged member 401 via a joint 408, again in an analogous fashion to the embodiments already described. The lower end of the pole 404 pivotally supports a couple of water collectors 406, each with an inlet front mouth 406a and a tail with fins 406b. The assembly of the two collectors can rotate freely around the central axis of the pole 404, like the transversal rod with the turbines of the first embodiment. Moreover, each collector can swing around a transversal axle (orthogonal to the central axis of the pole), indicated at 407 in FIG. 14. The collectors are hydraulically connected to a water circuit, not shown, formed in the core 404b of the pole 404. The water circuit is communicated with the engine room inside the block 404d which houses a generation system, e.g. a Francis turbine, for converting the water flow into electric energy.

The upper submerged member 401 is a completely submerged tank full of air, whose buoyancy is balanced by the weight of the pole 404 (including the central block 404d with the counterweight) and the water collectors 406. Under the action of the waves, the pole 404 will move in a vertical reciprocating motion with respect to the linking piece 405, and together with the ball member 412 will move in an oscillating tilting motion with respect to the lower submerged member 402. The block 404d may slip outside the hole 412a without affecting the working of the apparatus, as the cage structure 404c will in this case enter into in contact with the ball member 412 and provide the required resistance. The consequent motion of the lower end of the pole 404 will result in an inflow of pressurized water to the internal circuit of the pole, via the collectors 406, and consequently in a water flow that drives the turbine in the engine room. Also in this embodiment, therefore, power is extracted from the relative motion of the submerged members, causing the motion of one end of the connecting pole with respect to its surrounding water.

As in the first embodiment, a number of variants are possible in which either the function of the lower submerged member 402 is carried out simply by the linking piece 405 and the block 404d, and/or the upper joint 408 is rigid, or both this simplifications at the same time. It is also possible to consider a variant in which the collectors 406 are replaced by a plurality of collectors placed rigidly on the lower end of the pole and facing, above and beyond a number of different horizontal directions, various angled directions upwards and downwards with respect to the axis of the pole. In this case it might be necessary to place valves on the inner part of the collectors, to block the flow of water for those which do not face the direction of motion of the lower end of the pole. Such a variant (with all three simplifications at the same time) would be less efficient than the embodiment as shown in the figures, but would have the important advantage of not having any external moving part.

It will be appreciated from the above that the apparatus according to the invention is capable of circumventing all the limitations of the wave energy converters of the prior art, and that it uses a conceptually different system to extract energy from the waves.

The apparatus according to the invention can be placed completely under water, so that it can be protected from severe weather and if desired also isolated from shorter wavelength waves, which are contributors to wear and tear of offshore structures. Two or more submerged members are used, kept at rest with respect to the surrounding water by means of any combination of the following: partially enclosed water (virtual mass), fins, inertial mass, propellers.

Some of the submerged members (possibly one as in the first, second, fourth and fifth embodiments) have inertial mass as low as possible, and a size small with respect to the smallest of the main wavelengths which one wants to harvest for energy, but big enough to intercept enough water motion.

Other submerged members or connection means have correspondingly very large inertial mass (in the first, second, fourth and fifth embodiments), to compensate for the buoyancy of the previous ones. In the third embodiment, instead, all the submerged members have the inertial mass to compensate for the buoyancy inside them.

The members tend to follow the motion of the water which intimately surrounds them, which is approximately circular for a single monochromatic wave. When the members are placed in different motion regimes with respect to the main wavelengths (e.g. at different depths), they move with respect to each other. By linking them with connecting means, it is possible to extract energy from this relative motion or from the induced relative motion of the connection means with respect to some submerged members or to the surrounding water.

Thus, the advantages of the present apparatus can be summarized as follows.

It is more efficient because it uses all the components of the wave motion, its members being kept as much as possible at rest with respect to the surrounding water, contrary to a traditional apparatus using one or more floats as surface element.

It can have a simple design, very easy to implement and maintain, especially in some of the simplified variants described. As mentioned, this can be useful also for prototyping purposes.

Having only submerged elements with very low, or very large inertial mass it has a negligible motion due to natural oscillations.

It can be positioned offshore, in very deep water. Its average geographic position can be kept constant with the use of thrust means, or can in any case be signaled by means of the GPS system coupled to radio transmitters and/or light emitters and/or sonar buoys.

It can be designed in such a manner as to be largely unaffected, or only slightly affected, by extremely severe weather. The whole apparatus will move due to very big waves, so that the relative distance between the members will exceed the limit point only under a very unlikely combination of factors. In any case, if the motion does exceed the maximum limit, the apparatus can be designed to simply disassemble, and one can arrange for the system to reassemble itself once the storm is over (possibly in an automated way, if the members are provided with propellers.

It works as efficiently with a monochromatic wave system as with a non monochromatic one, and is not sensible to the wave direction;

The size of the apparatus and the energy which it can harvest from the waves is limited only by the wavelength. A simplified computation shows that it should be possible to construct apparatuses producing more than 10 MW of power (as an average) from 5 m high (or higher) monochromatic deep water waves.

All the embodiments have been described referring to their oceanic configuration; embodiments destined for deployment in areas with smaller wavelength waves will be accordingly scaled down.

Various modifications and alterations may be appreciated based on a review of this disclosure. These changes and additions are intended to be within the scope and spirit of the disclosure as defined by the following claims.

What is claimed is:

1. A wave energy converter apparatus, which comprises:
   at least two members joined by a connector movable so as to allow displacement of the members relative to one another in response to waves in water where the apparatus is located,
   the apparatus further comprising an energy converter for converting motion of the connector into electrical energy, and a device for storing and/or transporting elsewhere the energy produced,
   wherein, when in use and located in a body of water, the at least two members are completely submerged, the apparatus, as a whole, being neutrally buoyant, and a member being provided for maintaining each of the submerged members substantially at rest relative to the surrounding water with which they are in contact, such that the submerged members move under wave-induced action substantially in the same manner as a water particle would move under wave-induced action if located in the same region as the respective submerged member,
   the at least two submerged members being spaced from one another so as to assume respective positions affected differently by the wave-induced water motion, the at least two submerged members including an upper and a lower submerged member.

2. The apparatus set forth in claim 1, further comprising a plurality of submerged members, each having at least one tank filled with water and air,
   the submerged members being connected mutually via a plurality of elongated elements so as to form a three dimensional assembly,
   the elongated elements having an axially extensible structure, and
   the energy converter including a generator driven by the reciprocating extension and contraction movement of the elongated elements.

3. The apparatus set forth in claim 2, further comprising four submerged members joined via six elongated elements so as to form a tetrahedral assembly.

4. The apparatus set forth in claim 2, wherein each elongated element has a stick slidably engaging coaxially and telescopically with a tubular sleeve, the generator being joined with the inner end of the same sleeve so as to be fed by the mutual reciprocating movement of the stick and sleeve.

5. The apparatus set forth in claim 2, wherein the submerged members have a relatively small size in relation to the smallest of the main wavelengths desired to be harvested.

6. The apparatus set forth in claim 1, wherein the upper and lower submerged members each comprises a tank filled with air.

7. The apparatus set forth in claim 1, wherein the upper and lower submerged members each comprises a tank, at least one of the tanks being filled with air.

8. The apparatus set forth in claim 1, wherein the upper and lower submerged members each comprises a tank, at least one of the tanks being filled with water and air.

9. The apparatus set forth in claim 1, wherein the position-maintaining member includes a weight associated with the connector for maintaining each of the submerged members substantially at rest relative to the surrounding water.

10. A wave energy converter apparatus, which comprises:
    at least two members joined by a connector movable so as to allow displacement of the members relative to one another in response to waves in water where the apparatus is located,
    the apparatus further comprising an energy converter for converting motion of the connector into electrical energy, and a device for storing and/or transporting elsewhere the energy produced, wherein, when in use and located in a body of water, the at least two members are completely submerged, the apparatus, as a whole, being neutrally buoyant, and a member being provided for maintaining each of the submerged members substantially at rest relative to the surrounding water with which they are in contact, such that the submerged members move under wave-induced action substantially in the same manner as a water particle would move under wave-induced action if located in the same region as the respective submerged member, the at least two submerged members being spaced from one another so as to assume respective positions affected differently by the wave-induced water motion, the at least two submerged members further including an upper submerged member and a lower submerged member, respectively, wherein the upper and lower submerged members each comprises a tank filled with water and air, and the position-maintaining member having a weight associated with the connector.

11. The apparatus set forth in claim 10, wherein the connector has an elongated element extending between the members and connected in a movable manner at least relative to the lower submerged member.

12. The apparatus set forth in claim 11, wherein the lower submerged member includes a piece for linking the member to the elongated element, the linking piece having a ball member with a hole for slidable engagement of the elongated element, the ball member being rotatable within a housing defined by an external body of the piece.

13. The apparatus set forth in claim 11, wherein the elongated element is connected to the upper submerged member via a ball joint.

14. The apparatus set forth in claim 11, wherein the elongated element extends beyond the lower submerged member, the energy converter having a turbine joined to the lower end of the elongated element.

15. The apparatus set forth in claim 11, wherein the elongated element extends beyond the lower submerged member, the energy converter having a water collection device, connected to the lower end of the elongated element, a water circuit being formed within the elongated element and in communication with the water collection device, and a water turbine in the elongated element driven by the water delivered via the water circuit.

16. The apparatus set forth in claim 15, wherein the elongated element has an axial core in which the water circuit is formed, the core extending from a central block engaged with the hole of the ball member and enclosing an engine room for the water turbine, and a reinforcing cage about the core and projecting axially from the periphery of the block.

17. The apparatus set forth in claim 12, wherein the energy converter includes a generator driven by mutual displacement between the elongated element and the ball member, and between the ball member and the external body.

18. The apparatus set forth in claim 10, wherein the connector comprises a plurality of cables attached at a first end to the upper submerged member and by the other end to weights, the cables passing through deviation pulleys supported by frames mounted on the lower submerged member, the energy convertor comprising a dynamo driven by the pulleys and housed in, or associated with, the lower submerged member.

19. The apparatus set forth in claim 10, wherein the upper submerged member has a relatively small size relative to the smallest of the main wavelengths desired to be harvested.

20. The apparatus set forth in claim 19, wherein the lower submerged member comprises a plurality of tanks arranged peripherally about a cylindrical side surface of a central disc-shaped or ring-shaped body.

21. The apparatus set forth in claim 10, wherein a plurality of buoyancy elements are joined via cables to a top surface of the upper submerged member.

22. The apparatus set forth in claim 10, wherein a plurality of buoyancy elements are joined via cables to respective ends of radial beams protruding from the lower submerged member.

23. The apparatus set forth in claim 11, wherein the elongated element has an axially extensible structure, the energy converter having a generator driven by the reciprocating extension and contraction movement of the elongated element.

* * * * *

UNITED STATES PATENT AND TRADEMARK OFFICE
CERTIFICATE OF CORRECTION

PATENT NO.         : 8,581,431 B2
APPLICATION NO.    : 12/312901
DATED              : November 12, 2013
INVENTOR(S)        : Michele Grassi

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this
Second Day of June, 2015

Michelle K. Lee
*Director of the United States Patent and Trademark Office*